United States Patent
George et al.

(10) Patent No.: US 6,927,922 B2
(45) Date of Patent: Aug. 9, 2005

(54) IMAGING USING A MULTIFOCAL ASPHERIC LENS TO OBTAIN EXTENDED DEPTH OF FIELD

(75) Inventors: Nicholas George, Pittsford, NY (US); Wanli Chi, Rochester, NY (US)

(73) Assignee: The University of Rochester, Rochester, NY (US)

(*) Notice: Subject to any disclaimer, the term of this patent is extended or adjusted under 35 U.S.C. 154(b) by 35 days.

(21) Appl. No.: 10/324,255

(22) Filed: Dec. 18, 2002

(65) Prior Publication Data

US 2003/0142877 A1 Jul. 31, 2003

Related U.S. Application Data

(60) Provisional application No. 60/341,580, filed on Dec. 18, 2001.

(51) Int. Cl.[7] .......................... G02B 3/02; G02B 13/18; G02B 13/10
(52) U.S. Cl. ...................... 359/708; 359/721
(58) Field of Search ................ 359/708–710, 359/721, 724, 725, 742–743, 558–560; 348/335, 360, 36, 207.1; 382/254, 255, 264

(56) References Cited

U.S. PATENT DOCUMENTS

| | | | |
|---|---|---|---|
| 4,340,283 A | | 7/1982 | Cohen |
| 5,322,998 A | * | 6/1994 | Jackson ....................... 359/709 |
| 5,438,366 A | * | 8/1995 | Jackson et al. ............. 359/709 |
| 5,483,366 A | * | 1/1996 | Atherton ...................... 349/42 |
| 6,493,143 B2 | * | 12/2002 | Kato ........................... 359/708 |
| 2001/0008418 A1 | * | 7/2001 | Yamanaka et al. .......... 382/254 |
| 2004/0008423 A1 | * | 1/2004 | Driscoll et al. ............. 359/725 |

OTHER PUBLICATIONS

John C. Ross; "The Image Processing Handbook, second edition"; 1995; CRC Press Inc; pp. 327–339.*

Burch, S.F. et al., Image Restoration by a Powerful Maximum Entropy Method, Computer Vision, Graphics, and Image Processing, vol. 23, pp. 113–128(1983), Aug.

OptiPro Systems, Inc., Home Page and OptiProSX50Technical Data, Printout from web site at www.optipro.com (2001), May.

Ojeda–Castaneda J. et al., Line–spread function relatively insensitive to defocus, Optics Letters, vol. 8, No. 8, pp. 458–460 (1983), Mar.

Poon, T.–C. et al., Otical/digital incoherent image processing for extended depth of field, Applied Optics, vol. 26, No. 21, pp. 4612–4615 (1987), Nov.

Ojeda–Castaneda, J. et al., Zone plate for arbitrarily high focal depth, Applied Optics, vol. 29, No. 7, pp. 994–997 (1990), Mar.

(Continued)

*Primary Examiner*—Georgia Epps
*Assistant Examiner*—Alicia M. Harrington
(74) *Attorney, Agent, or Firm*—Kenneth J. Lukacher

(57) ABSTRACT

A system for imaging with a circularly symmetric multifocal aspheric lens is provided for obtaining an extended depth of field. The system includes a camera for capturing an image of at least one object through a circularly symmetric multifocal aspheric lens to provide a blurred image, and a computer system for processing the captured blurred image to provide a recovered image of the object having an extended depth of field. The recovered image may be outputted to a display or other peripheral device. Processing of the blurred image utilizes one of inverse filtering, convolution matrix (e.g., edge sharpening matrix), or maximum entropy. The computer system performing image processing may be in the camera or represent a computer system external to the camera which receives the blurred image. The extended depth of field is characterized by the object being in focus over a range of distances in the recovered image.

81 Claims, 15 Drawing Sheets

OTHER PUBLICATIONS

Dowski, E. et al., Extended depth of field through wave-front coding, Applied Optics, vol. 34, No. 11, pp. 1859–1866 (1995), Apr.

van der Gracht, J. et al., Aspheric optical elements for extended depth of field imaging, SPIE, vol. 2537, pp. 279–288 (1995).

Wach, H. et al., Control of chromatic focal shift through wave–front coding, Applied Optics, vol. 37, No. 23, pp. 5359–5367 (1998), Aug.

Tucker, S. et al., Extended depth of field and aberration control for inexpensive digital microscope systems, Optics Express, vol. 4, No. 11, pp. 467–474 (1999), May.

Soroko, L. et al., Axicons and Meso–Otical Imaging Devices, Progress in Optics XXVII, E. Wolf ed. (Elsevier, New York) pp. 111–160 (1989).

Sochacki, J. et al., Phase retardation of the uniform–intensity axilens, Optics Letters, vol. 17, No. 1, pp. 7–9 (1992).

Sochacki, J. et al., Nonparaxial design of generalized axicons, Applied Optics, vol. 31, No. 25, pp. 5326–5330 (1992).

Steinert, R. et al., A Prospective, Randomized, Double–masked Comparison of a Zonal–Progressive Multifocal Intraocular Lens and a Monofocal Intraocular Lens, Ophthalmology, vol. 99, No. 6, pp. 853–861 (1992).

Luneburg, R., Mathematical Theory of Optics, University of California Press, Berkley and Los Angeles, pp. 86–88 (1964).

Dwight, H., Tables of Integrals and Other Mathematical Data, (Macmillan, New York), Eq. (380.001), pp. 70–71 (1947).

Wolfram, S., Mathematical Software 4.0 Help Browser, 3.8.1 Curve Fitting, Wolfram Research, Champaign, IlL (1999).

QED Technologies, LLC, Information Brief, Magnetorheological Finishing (MRF): A Production–Ready Technology, Convergence, Mar./Apr. 1998.

Hunt, B., The Application of Constrained Least Squares Estimation to Image Restoration by Digital Computer, IEEE Transaction on Computers, vol. C–22(9), pp. 805–812 (1973).

Gonzalez, R. et al., Digital Image Processing (Addison–Wesley, Reading, Mass.) pp. 218–221 (1992).

Gull, S. et al., Maximum entropy method in image processing, IEE Proceedings, vol. 131, Pt. F., No. 6, pp. 646–659 (1984).

\* cited by examiner

MAXIMUM ENTROPY METHOD DESCRIBES HOW TO CHANGE THE ASSUMED OBJECT TO OBTAIN THE NEXT ONE

FIG. 7A
TWO-POINT OBJECT
FIG. 7B
BLURRED &NOISY
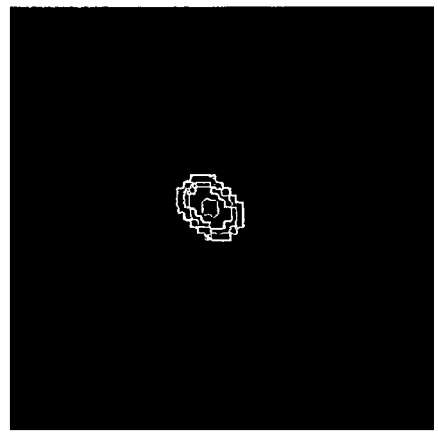
INVERSE FILTER RECOVERY
FIG. 7C
MAX ENTROPY RECOVERY
FIG. 7D

BLURRED NOISY IMAGE

INVERSE FILTER RECOVERY (B)

INVERSE FILTER RECOVERY (A)

MAXIMUM ENTROPHY RECOVERY

FIG. 12A
BLURRED & NOISY
FIG. 12B
EDGE SHARPENING
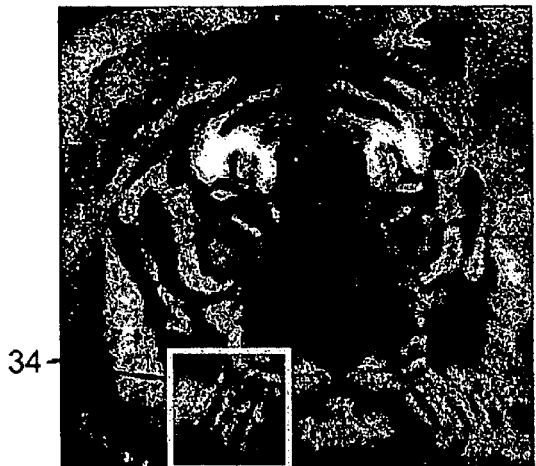
34
INVERSE FILTER
FIG. 12C
MAX ENTROPY
FIG. 12D

BLURRED & NOISY

EDGE SHARPENING

INVERSE FILTER

MAX ENTROPY

IMAGING USING A MULTIFOCAL ASPHERIC LENS TO OBTAIN EXTENDED DEPTH OF FIELD

DESCRIPTION

This application claims the benefit of priority to U.S. Provisional Patent Application No. 60/341,580, filed Dec. 18, 2001, which is herein incorporated by reference.

The U.S. Government has rights in this invention pursuant to grant no. DAAD 19-00-1-0551 from U.S. Department of Defense/U.S. Army Research Office.

FIELD OF THE INVENTION

The present invention relates to a system, method, and apparatus for imaging using a multifocal aspheric lens to obtain extended depth of field, and in particular to a system, method, and apparatus using a circularly symmetric multifocal aspheric lens to obtain a blurred image and then processing of the blurred image to provide a recovered image having an extended depth of field over which object or objects in the image are in focus. The present invention also relates to a new class of lenses having a logarithmic phase function, which are circularly symmetric, multifocal, and aspheric.

BACKGROUND OF THE INVENTION

In conventional digital camera photography, object or objects in an image of a scene are in focus at one distance (or distance range) from the camera often results in other objects at other distances in the same scene being out of focus. This is especially the case when imaged objects are at different distances close to the camera, such as within 10 feet or less, where optimal focus may be limited to a single limited distance range. Such conventional digital cameras may have a focusing mechanism to change the limited distance range where objects in the image will be in focus. However, the focusing mechanism does not prevent objects outside this distance range being out of focus in the image. Thus, it would be desirable to provide imaging having an extended depth of field where the same object extending over a range of distances, or different objects at different distances are all in focus in an image of a common scene captured by a digital camera.

Prior research has developed optical systems for extending the depth of field either by the use of an apodization filter or by computer processing of purposefully blurred images, such as described in the following academic literature: J. Ojeda-Castaneda, L. R. Berriel-Valdos, and E. Montes, Opt. Lett. 8, 458 (1983); T.-C. Poon, and M. Motamedi, Appl. Opt. 26, 4612 (1987); J. Ojeda-Castaneda, and L. R. Berriel-Valdos, Appl. Opt. 29, 994 (1990); E. R. Dowski, and W. T. Cathey, Appl. Opt. 34, 1859 (1995); J. van der Gracht, E. R. Dowski, W. T. Cathy and J. P. Bowen, Proc. SPIE 2537, 279 (1995); H. B. Wach, W. T. Cathey, and E. R. Dowski, Jr., Appl. Opt. 37, 5359 (1998); S. C. Tucker, E. R. Dowski, and W. T. Cathey, Optics Express 4, 467 (1999). Related research is also cited on axilenses which are optical elements that concentrate light energy along an optical axis, such as described in: L. M. Soroko, in *Progress in Optics*, E. Wolf, ed. (Elsevier, N.Y., 1989), pp109–160, and references therein; J. Sochacki, S. Bara, Z. Jaroszewicz, and A. Kolodziejczyk, Opt. Lett. 17, 7 (1992); J. Sochacki, A. Kolodziejczyk, Z. Jaroszewicz, and S. Bara, Appl. Opt. 31, 5326 (1992).

It is a feature of the present invention to capture images through a circularly symmetric multifocal aspheric lens providing a blurred image which is then digitally processed to provide an image with an extended depth-of-field over which object or objects in the image are in focus. Prior approaches in extending depth of field described in the above-identified literature have neither utilized a circularly symmetric aspheric lens, nor have provided processing of burred images obtained through such a lens to obtain images with improved focus over a large depth of field.

SUMMARY OF THE INVENTION

It is an object of the present invention to provide an improved system, method, and apparatus for capturing and processing images to provide an extended depth of field using a circularly symmetric multifocal aspheric lens.

It is another object of the present invention to provide an improved system, method, and apparatus for capturing an image through a circularly symmetric multifocal lens to provide a blurred image and processing of the blurred image in accordance with the point spread function of the lens to provide a recovered image in which one or more objects in a range of distances are in focus in accordance with the multifocal lengths of the lens.

It is a further object of the present invention that digital processing of such blurred images captured, through a circular symmetric multifocal lens may be carried out by various methods, such as inverse filtering, convolution matrix, or maximum entropy.

It is still another object of the present invention to provide a camera with an extended depth of field to avoid the need for mechanical focusing required by prior art cameras to focus on objects at any particular distance.

Yet still another object of the present invention is to provide a new class of optics having a logarithmic phase function for use in imaging applications.

Briefly described, the system embodying the present invention includes an image capturing unit, such as a digital camera, having a circularly symmetric aspheric lens (optics) to capture an image of one or more three-dimensional objects in a scene, and an image processor, such as a computer system, for processing the image to provide a recovered image having an extended depth-of-field (or range of distances) over which object or objects in the image are in focus. The recovered image may be outputted to a display or other peripheral device. The image processor may be part of the image capturing unit, or represent an external computer system coupled to the display which receives the blurred image. Processing of the blurred image may be by one of inverse filter, convolution matrix (e.g., edge sharpening matrix), or maximum entropy in accordance with the point spread function of the lens.

The circularly symmetric aspheric lens is multifocal in that its focal length varies continuously with the radius of the lens, in which the lens is characterized by the equation:

$$\phi(r) = -\left\{ \frac{2\pi}{\lambda_0}(\sqrt{r^2+t^2}-t) + \frac{\pi}{\lambda_0}\frac{R^2}{s_2-s_1} \right.$$

$$\left[ \ln\left\{2\frac{s_2-s_1}{R^2}[\sqrt{r^2+\left(s_1+\frac{s_2-s_1}{R^2}r^2\right)^2} + \left(s_1+\frac{s_2-s_1}{R^2}r^2\right)\right] + \right.$$

$$\left.\left. 1\right\} - \ln\left(4\frac{s_2-s_1}{R^2}s_1+1\right)\right]\right\}.$$

where, $\phi(r)$ is the phase delay for radius r of the lens to within an arbitrary constant, said range is over distances $s_1$ through $s_2$, R is the outer radius of the lens, t is the distance from the plane where the lens is disposed to the plane of image capture by said capturing means, and $\lambda_0$ is the free space wavelength.

The present invention utilizes a new class of lenses, called logarithmic aspheres. Different lenses of this class may be provided with different extended depth of field performance in the above-described system by varying the rate of change of focal length with radius, where each different lens has different phase delay logarithmic function $\phi(r)$, but are all circular symmetric and multifocal.

In an image-capturing unit representing a digital camera, the above-described multifocal lens may replace the conventional (photographic) objective lens or lens system of the camera. The above-described multifocal lens may represent one or more optical elements for multi-focal blurred imaging. For example, the multifocal lens may represent a multi-focal phase plate (or mask), which may be used in combination with a conventional lens or lens system of a camera. This is particularly useful since such multi-focal phase plate can be readily mounted on an existing camera to provide the above-described image-capturing unit and have an angular field of view in accordance with the conventional lens of the camera. Although the lenses are diffraction limited, the system having a digital camera would not be diffraction limited due to its reliance on a CCD or other electronic image detector.

In addition to the image capturing unit representing a digital camera (still or video), it may further represent a film-based camera for recording on film the blurred image captured through the above-described multifocal lens, or conventional camera and phase plate, and then a digital scanner to digitize one of a print or negative representing the blurred image recorded on the film to provided a digitized blurred image, in which the image processor receives and processes the digitized blurred image to provide a recovered image.

The term object or objects may refer to any physical object, person, or other surroundings, in a scene, which may be located at one or more distances, or extend over a range of distances, from the image capturing unit.

BRIEF DESCRIPTION OF THE DRAWINGS

The foregoing objects, features, and advantages of the invention will be more apparent from the following description in conjunction with the drawings, in which:

FIG. 1A is a perspective view of the staircase, and FIG. 1B shows a detailed view of each riser step of the staircase of FIG. 1A;

FIGS. 7A, 7B, 7C, and 7D illustrate a computer simulation for the comparison of the inverse filter and maximum entropy recovery processing for the example of a two-point source object, where FIG. 7A shows an image of the two-point source object, FIG. 7B shows the blurred image of the two-point source object of FIG. 7A, FIG. 7C shows the resulting recovered image by processing the blurred image of FIG. 7B by inverse filtering, and FIG. 7D shows the resulting recovered image by processing the blurred image of FIG. 7B by maximum entropy;

FIG. 9A shows the blurred image of the object, and FIGS. 9B and 9C show the resulting recovered images by processing the blurred image of FIG. 9A by inverse filtering using different noise models for the Wiener-Helstrom filter labeled (A) and (B), and FIG. 9D shows the resulting recovered images by processing the blurred image of FIG. 9A by maximum entropy;

FIGS. 12A, 12B, 12C and 12D show computer simulations of images comparing the different processes of image recovery upon a noisy blurred image of FIG. 12A using edge sharpening filter in FIG. 12B, inverse filter in FIG. 12C, and maximum entropy in FIG. 12D.

DETAILED DESCRIPTION OF THE INVENTION

Figure 1:
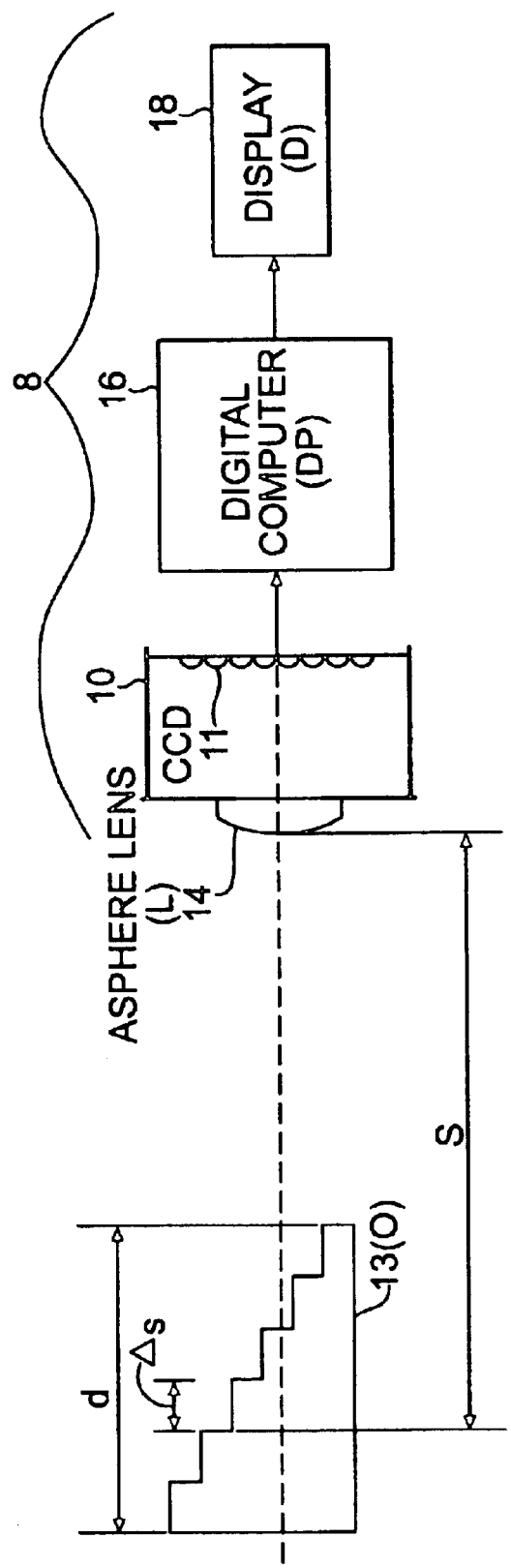
FIG. 1 is a block diagram of the system in accordance with the present invention.
Figure 1A:
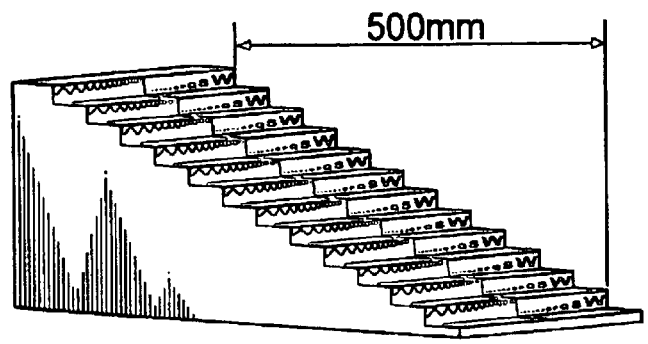
FIGS. 1A and 1B show is an example of a 3-dimensional object representing a staircase used to illustrate the system of FIG. 1, where
Figure 1B:
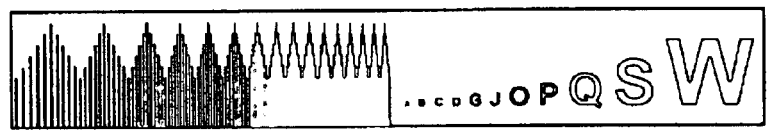
Figure 1C:
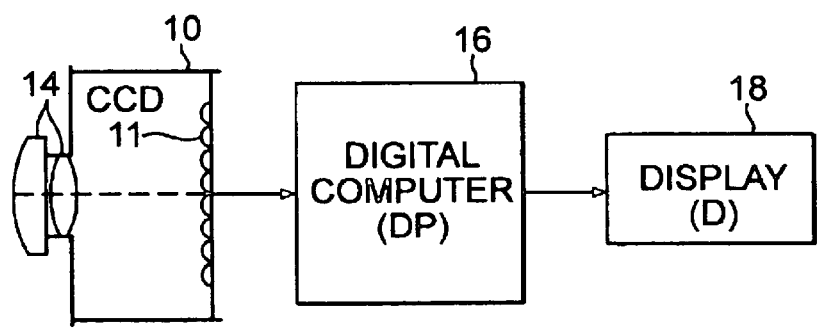
FIG. 1C is a block diagram showing the logarithmic asphere lens in the camera of FIG. 1 where the lens is provided by multiple optical elements.
Figure 1D:
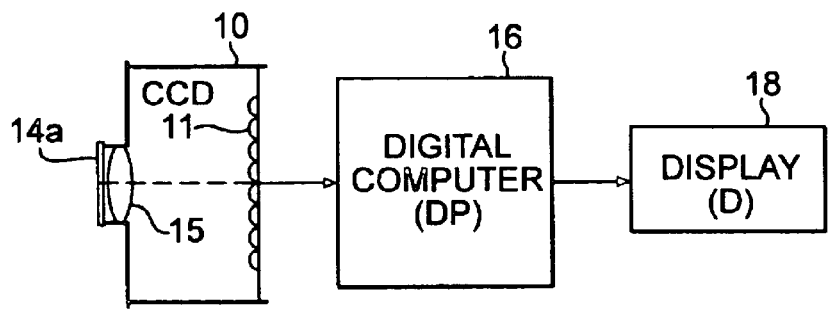
FIG. 1D is a block diagram showing another embodiment of the camera of FIG. 1 in which the logarithmic asphere lens is provided by a phase plate in a cascade relationship with an objective lens of a camera.

Referring to FIGS. 1 and 1A, an integrated imaging and processing system 8 is shown having a digital camera (or image capturing unit) 10 with a CCD array detector 11 for capturing images of an object 13 through a multifocal lens 14. The multifocal lens 14 represents a circularly symmetric lens with a focal length that various continuously with radius, so that for a 3-dimensional object or objects, over a desired distance range there is always an annular portion of the lens that provides a sharp in focus image, and the remainder of the lens contributes to blurring. Such a lens 14 represents an aspheric lens, and is hereinafter referred to as logarithmic asphere lens 14, and was designed using the Fermat's principle to find the transmission function for a lens that will image an extended portion of the object-optical-axis into a single image point. For purposes of illustration the object 13 is shown as a single three-dimensional object, such as a staircase, but object 13 may represent multiple objects which may be located in a scene. The captured blurred image of the object 13 can represent a two dimensional array of pixels in which each of the pixels has a value depending on the resolution of the CCD of the camera. For example, 8, 16, or 32 bit resolution may be used. Each captured blurred image of object 13 by camera 10 is outputted to an image processor representing a programmed microprocessor or computer system 16 which processes the image and then outputs the processed image to a display 18. Image processing may be provided by an inverse filter, or convolution matrix, applied to the pixels of the captured blurred image from camera 10 to produce a recovered image of the object having extended depth of field where the object is in focus in the image. The convolution matrix may be an edge sharpening filter. Other methods of image recovery may also be used, such as maximum entropy. The lens 14 may represent one or more optical elements providing point-to-point imaging and blurring, as shown in FIGS. 1 and 1C, or lens 14 may represent a phase plate (or mask) 14a (called herein a log-asphere phase plate) to provide blurring in a cascade relationship with an objective lens 15 for imaging, as shown in FIG. 1D. For example, the objective lens 15 for point to point imaging may be a conventional photographic lens. The lens 14 and phase plate 14a is diffraction limited in resolution. The design of lens 14 and digital processing of images captured through the lens is described below in more detail.

Computer system 16 may represent a personal computer, work station, lap-top, or other type of computer system, and the display 18 may represent a CRT or LCD display. The computer system 16 also may store the blurred and recovered images in memory, such as on a hard or optical disk, or output to other peripheral devices, such as a printer or via network interface, such as modem, Ethernet, Internet, T1 line, or the like, to other computer-based systems. Output of the captured image to computer system 16 may be through typical interface port (cable or optical) used by conventional digital camera for transferring images (or image files) to a computer system, or by storage of the captured image in removable memory of the camera, such as memory card, memory chip, disk, PCMCIA card, and the like, such that the removable memory may be provided to the separate computer system 16 for processing, via an interface suitable reading the image from the removable memory.

Alternatively, the programmed microprocessor or computer system 16 (with or without display 18) may be part of the camera 10. Thus, system 8 can be embodied on-board the housing of a digital camera having imaging through lens 14, where such camera provides the digital image processing of computer system 16.

Camera 10 may represent a typical digital camera adapted for use by replacement of its objective lens with lens 14, as shown in FIG. 1 where lens 14 represents a single element having a circularly symmetric aspheric body, or as shown in FIG. 1C where lens 14 represents multiple optical elements, or as shown in FIG. 1D where lens 14 represents log-asphere phase plate 14a in combination with the objective lens 15 of the camera. Although two optical elements are shown in FIG. 1C, two or more such elements can be used. The camera although described for still images may be a digital video camera taking successive images in which each image is processed in near real-time by computer system 16. Although imaging is described for gray scale, color imaging may also be provided by a suitable CCD array(s). One advantage of the digital camera with lens 14 is that physical objects at different distances in an imaged scene will, with image processing, be in focus in the outputted image. This is in contrast with a conventional digital camera without system 8 where an object in focus at one distance on the CCD array can result in other objects at other distances in the same scene being out of focus. Although lens 14 or phase plate 14a is diffraction limited, a digital camera utilizing such lens or plate would not be diffraction limited in resolution due to the pixel size of the CCD array(s) or other electronic image detector(s).

Figure 2:
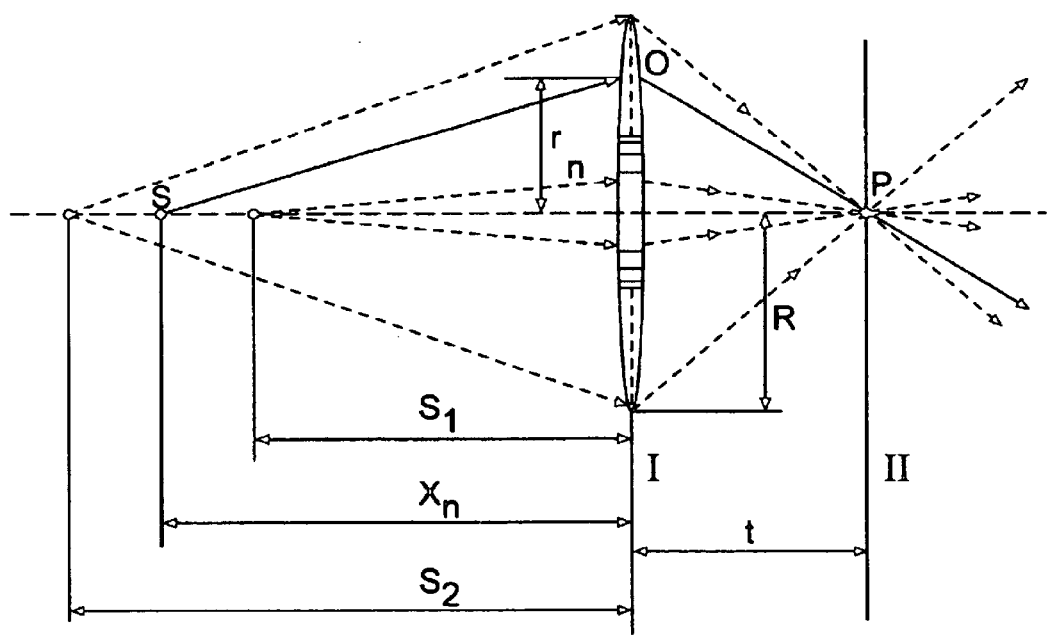
FIG. 2 is an optical diagram illustrating the notation for lens theory in the system of FIG. 1.

The theory underlying the design of lens 14 and processing of captured blurred images purposefully blurred through this lens follows. In this discussion, an image of an object (O) 13 is recorded (captured), such as the 3-dimensional staircase shown in FIG. 1, using camera 10 through aspherical lens (L) 14, and the recorded blurred image is digitally processed by computer system (DP) 16 and displayed on display (D) 18. An optical diagram of FIG. 2 is first considered. Object points ranging over distances $s_1$ through $s_2$ are all brought to focus at point P in plane (II) by means of a continuous radial variation in the focal length. Dividing the lens into annular rings of different focal lengths, one can verify that equal area is obtained for each of N rings by choosing a radius $r_n$ for the n th ring as follows:

$$r_n = (n/N)^{1/2} R, \quad (1)$$

where R is the outer radius of the lens in plane (I).

Consider the imaging of point S at $x(r_n)$ by the rays through the annular ring $r_n$. To provide uniform or natural illumination, the interval from $s_1$ to $s_2$ is subdivided into N segments; and the $x(r_n)$ segment is chosen to be weighted as follows:

$$x(r_n) = s_1 + (s_2 - s_1) n/N. \quad (2)$$

Combining Eqs. (1) and (2) to eliminate the ratio n/N gives the basic equation for the lens, viz., $$x(r) = s_1 + (s_2 - s_1) r^2 / R^2. \quad (3)$$

As is well-known in physical optics, the general transmission function, t(r), for a lens can be written in the form:

$$t(r) = \exp[-i\phi(r)], \quad (4)$$

in which $\phi(r)$ is the phase delay. The form of the phase delay $\phi(r)$ can be obtained by an application of Fermat's principle, see R. K. Luneburg, *Mathematical Theory of Optics* (University of California, 1964), p.86. First, an expression for the total optical length L for the ray through (SOP) is written as follows:

$$L = \sqrt{r^2 + x^2} + \phi(r)\lambda_0/(2\pi) + \sqrt{r^2 + t^2},\qquad(5)$$

where t is the distance from the lens plane (I) to (II) and $\lambda^0$ is the free space wavelength.

From Fermat's principle and Eq. (5), setting $\partial L/\partial r = 0$ with x constant, and by Eq. (3), the following expression for the phase delay $\phi(r)$, viz. is found, $$\phi(r) = -\frac{2\pi}{\lambda_0} \int_0^r \left\{ \frac{r}{\sqrt{r^2 + t^2}} + \frac{r}{\sqrt{r^2 + ([s_1 + (s_2 - s_1)r^2/R^2])^2}} \right\} dr. \qquad(6)$$

This can be directly integrated (see, for instance, H. B. Dwight, *Tables of Integrals and other Mathematical Data* (Macmillan, N.Y., 1947) Eq. 380.001, p.70.) to yield the basic formula for the logarithmic asphere lens, expressed in two terms:

$$\phi(r) = -\left\{ \frac{2\pi}{\lambda_0} \left( \sqrt{r^2 + t^2} - t \right) + \frac{\pi}{\lambda_0} \frac{R^2}{s_2 - s_1} \right. \qquad(7)$$

$$\left[ \ln\left\{ 2\frac{s_2 - s_1}{R^2} \left[ \sqrt{r^2 + \left(s_1 + \frac{s_2 - s_1}{R^2}r^2\right)^2} + \right. \right.\right.$$

$$\left.\left.\left. \left(s_1 + \frac{s_2 - s_1}{R^2}r^2\right)\right] + 1 \right\} - \ln\left\{ 4\frac{s_2 - s_1}{R^2}s_1 + 1 \right\} \right] \right\}.$$

The first term is an ideal lens for point-to-point imaging with the object point at infinity, and the second term introduces controlled blurring or aberration. As a first stage in the lens design, it is useful to form a power series expansion of Eq. (7) using $s_1 = 610$ mm, $s_2 = 6100$ mm, R=5 mm, and t=25 mm, the first and second members of Eq. (7) are:

$$\phi(r) = -\frac{2\pi}{\lambda_0} \{ 0.02r^2 - 8 \times 10^{-6} r^4 + 6.4 \times 10^{-9} r^6 - \qquad(8)$$

$$6.4 \times 10^{-12} r^8 + 7 \times 10^{-15} r^{10} + 7.435 \times 10^{-4} r^2 -$$

$$7.563 \times 10^{-5} r^4 + 5.1431 \times 10^{-6} r^6 -$$

$$1.803 \times 10^{-7} r^8 + 2.4614 \times 10^{-9} r^{10} \}.$$

These expansions are accurate to $\pm 10^{-5}$ mm for the bracketed term. The expansions are obtained using NonlinearFit of Mathematica, which is described in S. Wolfram, *Mathematical Software* 4.0 (Wolfram Research, Champaign, 2000) Statistics NonlinearFit, Sec. 3.8.1 (2000). Other values for $s_1$, $s_2$, R, and t may be used to provide a different $\phi(r)$ depending on the imaging application for the asphere lens.

Logarithmic asphere lens 14 may be being fabricated for t varying from 24 mm to 80 mm, but other values for t may be used. Recent advances in optical fabrication methods make this type of logarithmic asphere lens practical commercially. The logarithmic asphere lens may be fabricated using OptiPro Model SX50 computer-controlled asphere grinding machine, and a Magneto-Rheological Finisher commercially available from QED Technologies, LLC, Rochester, N.Y. The lenses may be fabricated in an optical grade of quartz to an overall accuracy on the order of one-tenth wavelength. By measuring the point spread function for the logarithmic asphere lens of the camera, one can determine whether the lens is in agreement with theory to assure that it will properly provide a properly blurred image for recovery by processing by the computer system 16. As stated earlier, the fabricated lens 14 represents a circularly symmetric lens and is multifocal as the focal length of the lens varies continuously with lens radius.

As described earlier, lens 14 may be provided by a two-stage optical system in accordance with $\phi(r)$ of Equation (7), where the lens 14 is provided by a conventional (photographic) lens 15 and a multi-focal-phase (corrector) plate 14a, i.e., log-asphere phase plate, capable of providing a properly blurred image for recovery by processing of the computer system 16, as illustrated in the block diagram of FIG. 1D. In other words, imaging and blurring is provicLed by two separate lenses, one lens 15 for ideal imaging and the other a phase plate 14a for controlled blurring, rather than a single lens 14. For any logarithmic asphere 14, there is a corresponding blurring phase-mask 14a. The phase plate 14a may be fabricated using the same machinery mentioned above for making the asphere lens. The phase mask 14a can be inserted into an optical system with any photographic lens 15 in order to achieve an extended depth of field. For example, the double-Gauss lens design commonly used in high-quality photographic lenses, the phase plate may be located in the plane of the aperture stop. Essentially all light rays passing this plane will thereby pass through the phase plate and contribute to the image. The phase plate 14a may also be placed at other locations in the path of the light rays, but preferably is located at the aperture stop or at the exit plane of light into the camera. Hence, a cascade of a conventional imaging lens 15 with the phase plate 14a can provide an extended depth of field over the angular field of view provided by the conventional imaging lens. For example, if lens 15 has a wide-angle performance, this will be retained as a feature with extended depth of field.

An example showing the imaging and depth of field provided by the logarithmic asphere lens is described below using a 3-dimensional object with 12 steps that are spaced axially by $\Delta s$ of 50 mm, as shown in FIG. 1. The logarithmic asphere lens has a t=60 mm and the monochrome CCD array has a pixel size of 23 $\mu$m square which limits the basic resolution of the system. On the riser of each step, a strip resolution chart is placed which contains a series of alphabet letters of varying size along with a chirped series of vertical lines, as shown in FIG. 1A.

Digital processing by the computer system 16 of the captured blurred image of the object may be used to provide a recovered image in which the object is observable and in focus over a range of distance over which the object extends. One method for recovery of the blurred image is to use an inverse filter or its equivalent matrix in picture space (in the image plane) based of the measured point spread function of the lens. Such an image plane matrix is used for convolution filtering. This filter can be obtained by an inversion of the Fourier plane Wiener-Helstrom inverse filter, such as described in B. R. Hunt, IEEE Trans. Computer. C-22, 805 (1973), and R. C. Gonzalez, and R. E. Woods, *Digital Image Processing* (Addison-Wesley, 1992), p.218. The Wiener-Helstrom inverse filter and its inverse filter in image space is shown below:

Wiener-Helstrom Inverse Filter $$\hat{F}(u, v) = \frac{H^*(u, v)}{|H(u, v)|^2 + \gamma |P(u, v)|^2} G(u, v)$$

$\hat{F}(u,v)$ recovered spectrum
$G(u,v)$ spectrum of blur image

H(u,v) transfer function
γ|P(u,v)|² noise power spectrum density
  γ is a constant determined by noise mean and variance.

$$P(u, v) = FT\left\{\begin{bmatrix} 0 & -1 & 0 \\ -1 & 4 & -1 \\ 0 & -1 & 0 \end{bmatrix}\right\}$$

Inverse Filter in Image Space:

$$\hat{f}(m, n) = f^{-1}\left\{\frac{H^*(u, v)}{|H(u, v)|^2 + \gamma |P(u, v)|^2}\right\} ** f^{-1}\{G(u, v)\}$$

Form the Image Space Convolution Filter by Approximation

The convolution matrix applied to the blurred image may be a 5×5 matrix or a 3×3 matrix, such as shown, for example, below. The 3×3 matrix may be very close to an edge-sharpening matrix. Hence, the filter need not be strongly dependent on the point spread function.

$$\begin{bmatrix} 0 & 0 & -0.07 & 0 & 0 \\ 0 & 0.51 & -0.85 & 0.51 & 0 \\ -0.07 & -0.85 & 5 & -0.85 & -0.07 \\ 0 & 0.51 & -0.85 & 0.51 & 0 \\ 0 & 0 & -0.07 & 0 & 0 \end{bmatrix} \text{ and } \begin{bmatrix} 0 & -1 & 0 \\ -1 & 6 & -1 \\ 0 & -1 & 0 \end{bmatrix} \quad (9)$$

Figure 3:
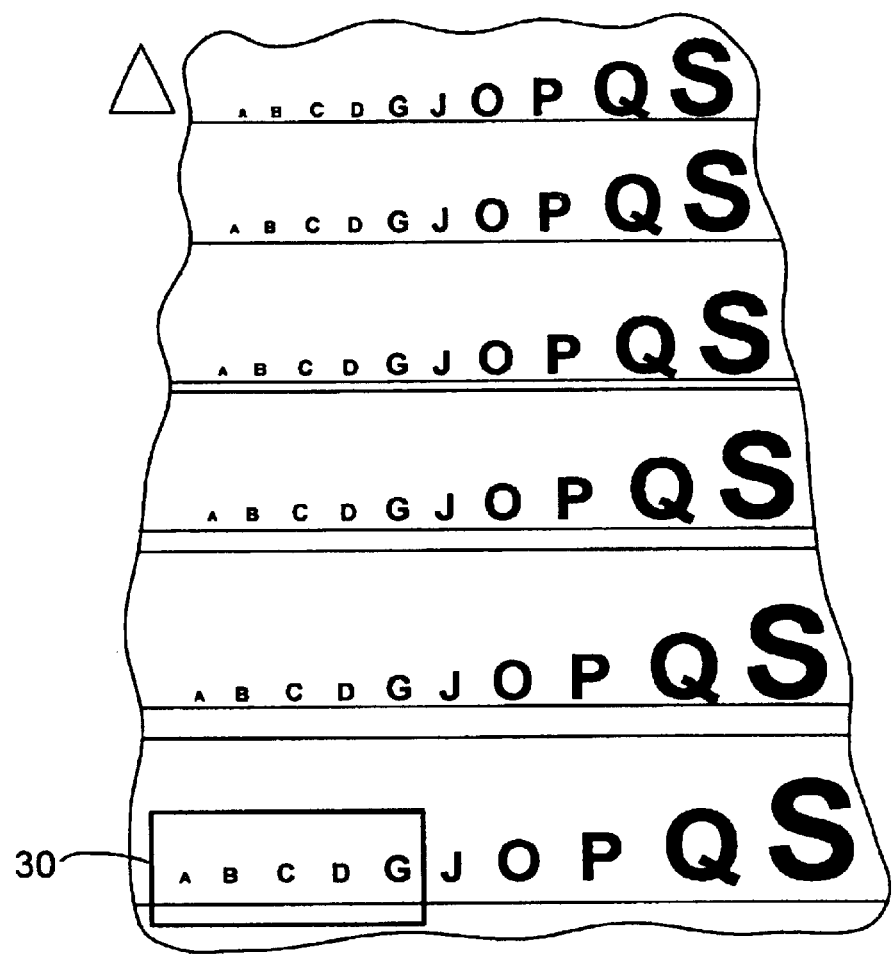
FIG. 3 is an example illustrating a recovered image of the right side (letters of increasing size on each step with the steps at different distances) from the 3-dimensional object of FIG. 1A by the system of FIG. 1.
Figure 4A:
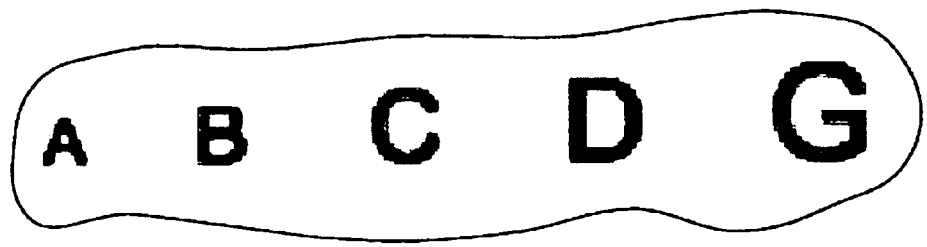
FIG. 4A is a detailed view of part of the first step of the recovered image of FIG. 3.
Figure 4B:
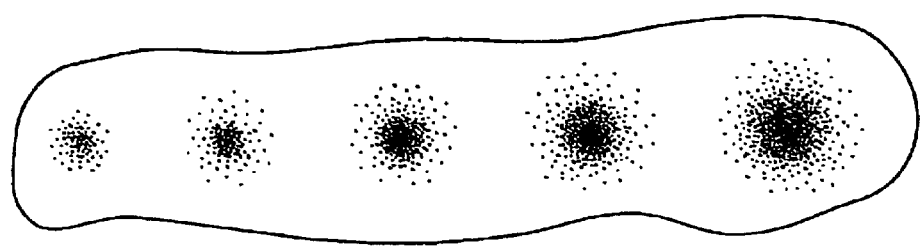
FIG. 4B is an the image of the same part of the first step of the object of FIG. 1A captured by the camera of FIG. 1 through a conventional objective lens rather than a multifocal lens in accordance with the present invention.

FIG. 3 shows a portion of the recovered (processed) 3-D step object including 6 steps varying in object distance by 250 mm. The in-focus position (Δ in FIG. 3) is at x=950 mm. FIG. 4A shows an enlargement of the final processed image at 30 in FIG. 3 that is 250 mm (5 steps) closer to the lens than the plane of best focus. For comparison in FIG. 4B, the blurred image is shown using a Nikon 60 mm (objective) lens rather than the logarithmic asphere lens in the system 8 with the same ƒ/D. This image is obtained using the same object positioning as that previously described. A greatly extended depth of field is provided by the logarithmic asphere lens.

Figure 5:
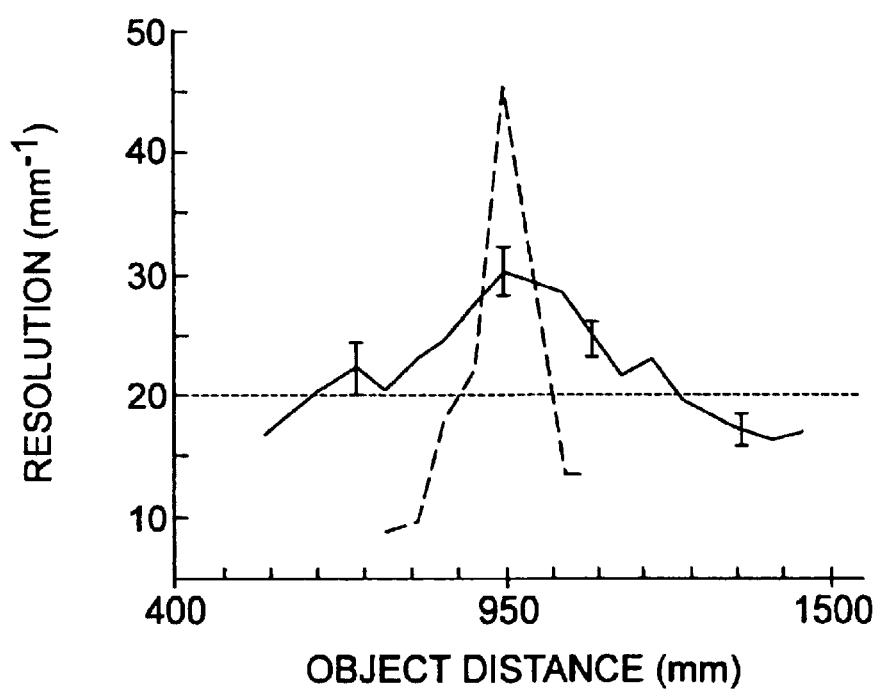
FIG. 5 is a graph of resolution ($mm^{-1}$) versus object distance (mm) illustrating the improved resolution of an imaged object by the system of FIG. 1, as indicated by the solid line, and by a camera through a conventional objective lens of the same object, as indicated by the dashed line.

In another example using the logarithmic asphere lens, the resolution is measured as a function of distance, as shown in FIG. 5. Data are taken at each step (50 mm) and the average value of 5 readings is plotted together as a solid line with error bars. The same setup as previously described is used except that resolution is measured using the fine-line chirped chart (left side of the staircase object of FIG. 1A). Also in effect the pixel size has been reduced to 10 μm. The dotted line shows the resolution limit for a 23 μm pixel size. For comparison, the resolution using the Nikon 60 mm (objective) lens, rather then the asphere lens, under identical conditions is also shown as a dashed line in FIG. 5. From these data, an increased depth-of-field for the camera 10 with the logarithmic asphere lens 14 is shown.

Figure 6:
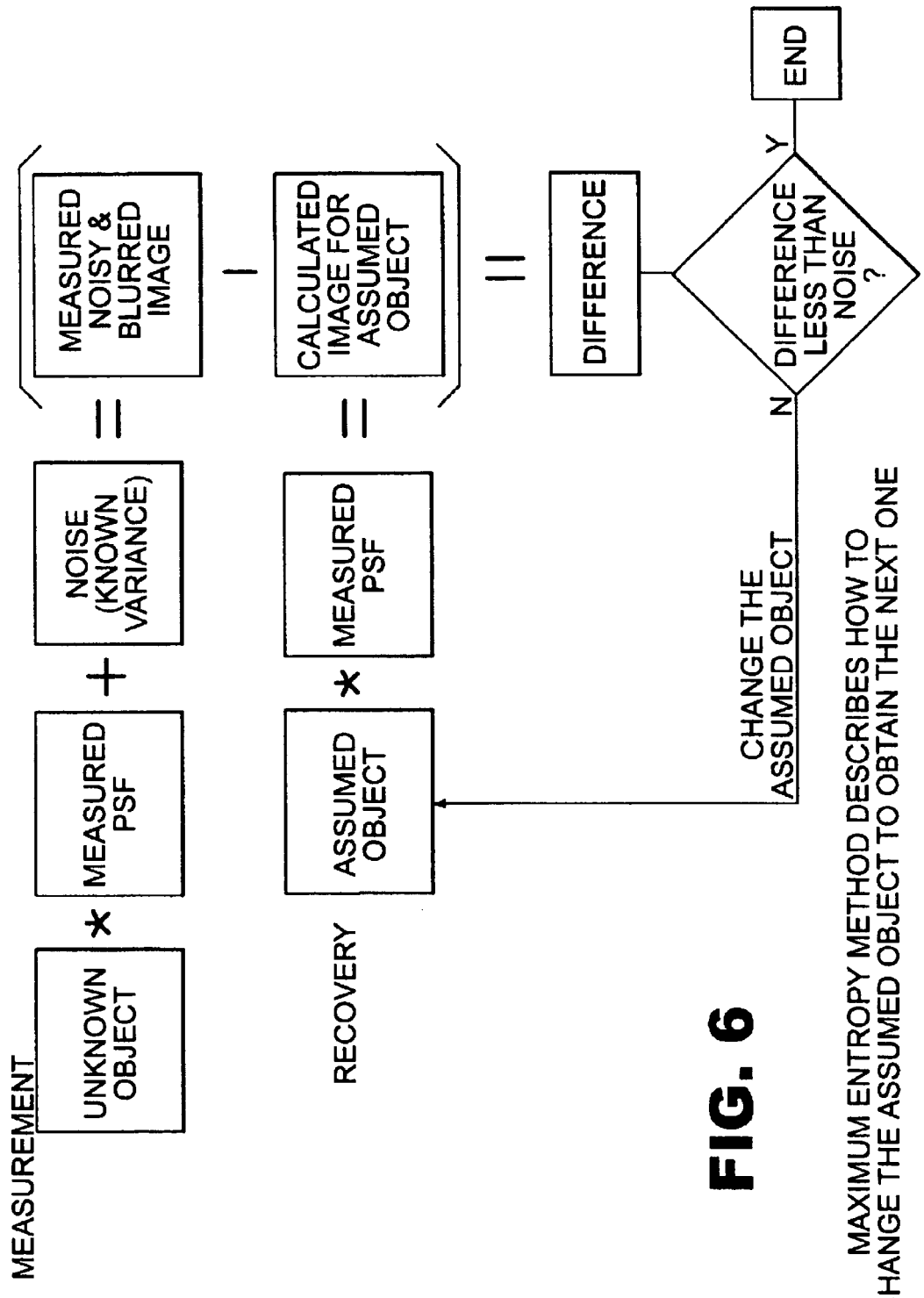
FIG. 6 illustrates the concept of maximum entropy processing which can be used to recover the blurred image of the object captured by the camera of FIG. 1.

Alternatively, the maximum entropy method may be programmed in computer system 18 to recover the blurred image of the object 13 rather than using an inverse filter (or convolution filter). The maximum entropy method is described, for example, in S. F. Gull and J. Skilling, Maximum Entropy Method In Image Processing, IEE Proc., Vol, 131, PT. F, No. 6, pp. 646–659 (1984). The basic process of the maximum entropy method is shown in FIG. 6. It represents an iterative process in which in each cycle the difference is determined between the captured blurred image of the object and a calculated blurred image produced from an assumed object convolved with the measured point source function. This difference is used to change the assumed object for the next cycle, and so forth, until the difference is less than noise (or within a noise tolerance), at such time the assumed object represents the image of the recovered object.

Figure 8:
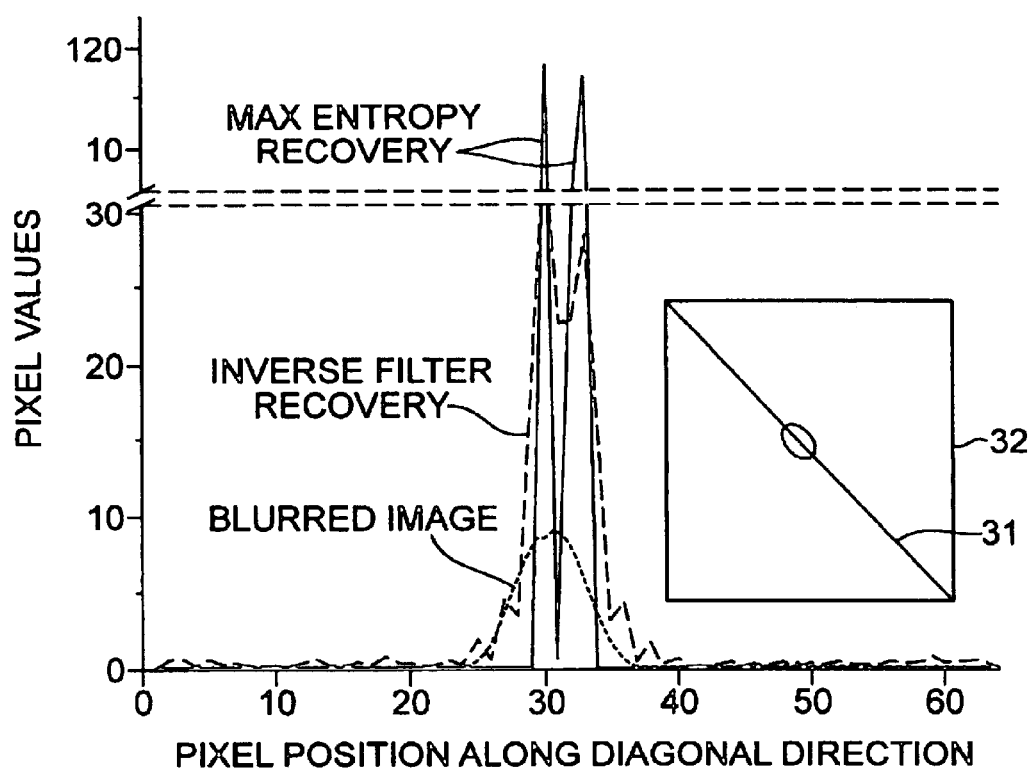
FIG. 8 is a graph illustrating the pixel value for different pixel positions along the same diagonal line through each of the images of FIG. 7B, 7C, and 7D, where pixels values of the line in the recovered image by maximum entropy (FIG. 7D) are indicated by a solid line, pixels values of the line in the recovered image by inverse filtering (FIG. 7C) are indicated by a dashed line, and pixels values of the line in the blurred image (FIG. 7B) are indicated by a dotted line.

The maximum entropy method can provide higher resolution images with less noise than the inverse filter method described earlier, as illustrated by the comparison images and graphs of FIGS. 7–13. In a first example, FIG. 7A shows a two-point source object 13, and FIG. 7B show the computer simulated blurred image of the two-point object. The computer system 16 processes the blurred image by inverse filtering to provide the recovered image shown in FIG. 7C, and also processes the image by maximum entropy to provide the recovered image shown in FIG. 7D. FIG. 8 is a graph of pixel values by pixel position along a diagonal line through the two-point source object in each of the recovered images of FIGS. 7C and 7D to compare the two recovery methods of inverse filtering and maximum entropy. The diagonal line in each image is denoted by the position of the line 31 through the blurred image (FIG. 7B) of the two point source object 32 (as illustrated in the representation of FIG. 7B in the graph of FIG. 8). As this graph shows, maximum entropy yielded better results by providing an image with higher resolution and less noise than by inverse filtering, which magnified the noise. For purposes of comparison, the pixel values by pixel position along the diagonal line 31 in the blurred image of FIG. 7B is shown as a dotted line in FIG. 8.

Figure 10:
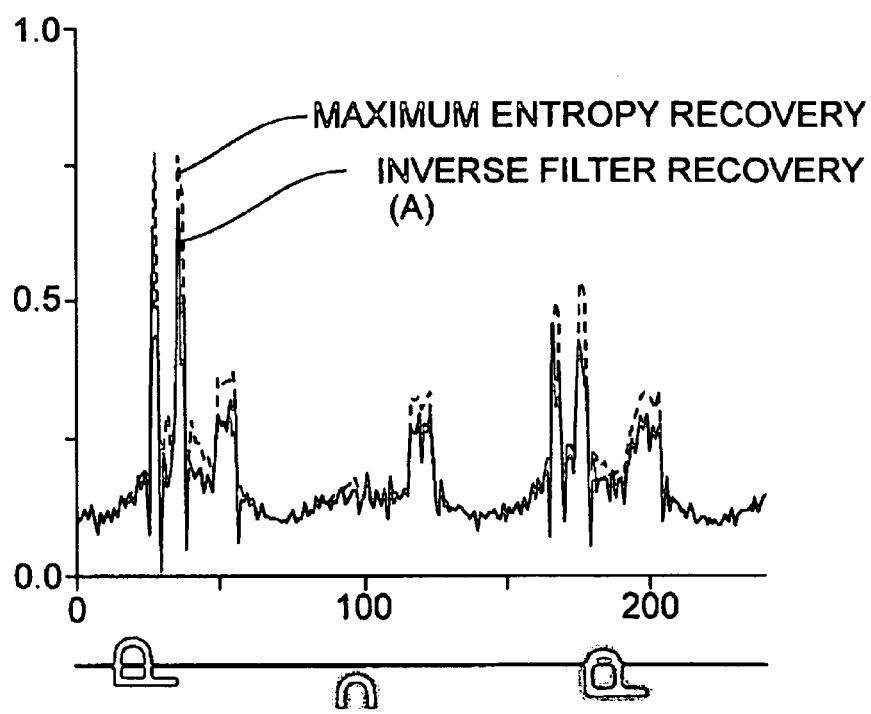
FIG. 10 is a graph illustrating a comparison of the sharpness of the pixels along a line through the recovered image provided by maximum entropy of FIG. 9D, as indicated by a dashed line, and the recovered image provided by inverse filter (A) of FIG. 9B, as example, by the line in the blurred image of FIG. 9A.
Figure 9A:
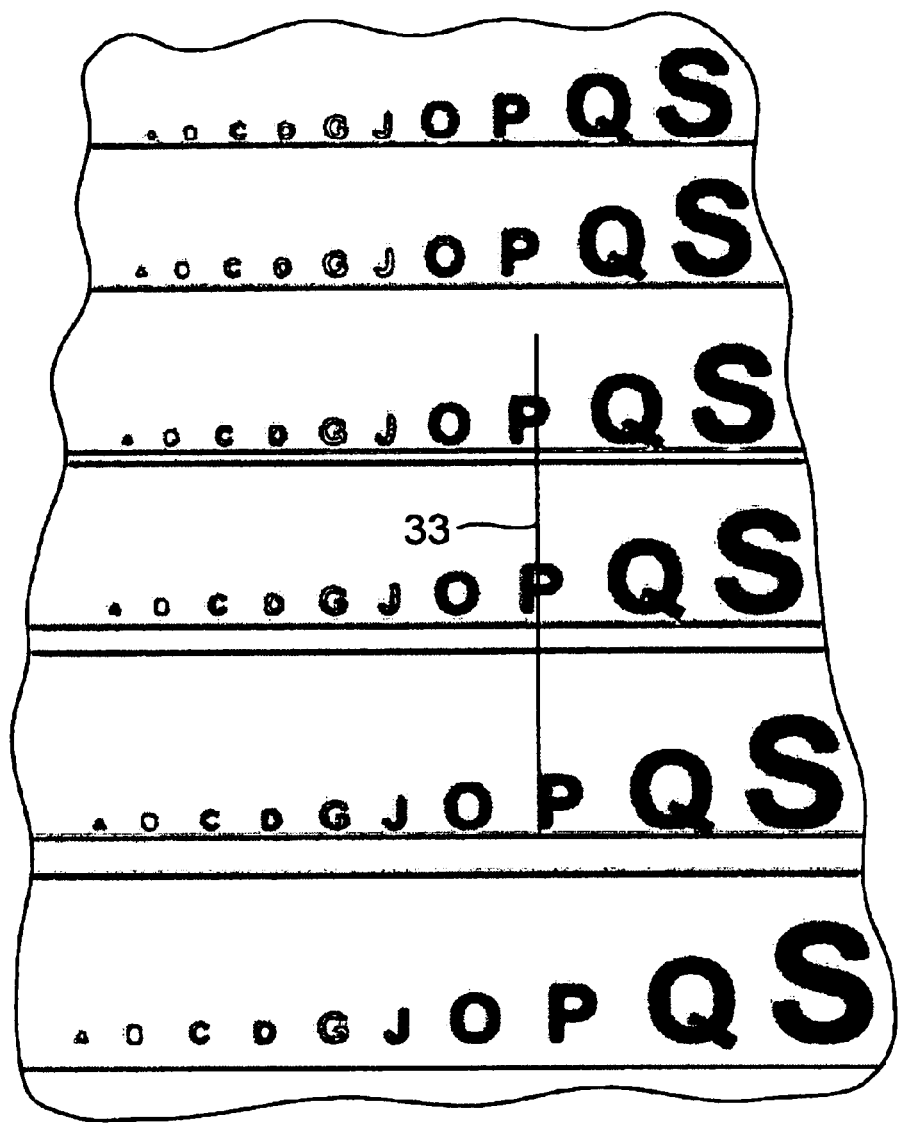
FIGS. 9A, 9B, 9C, and 9D illustrate a comparison of the inverse filter and maximum entropy recovery processing for the right part (letters) of the staircase object of FIG. 1A in the system of FIG. 1, where
Figure 9B:
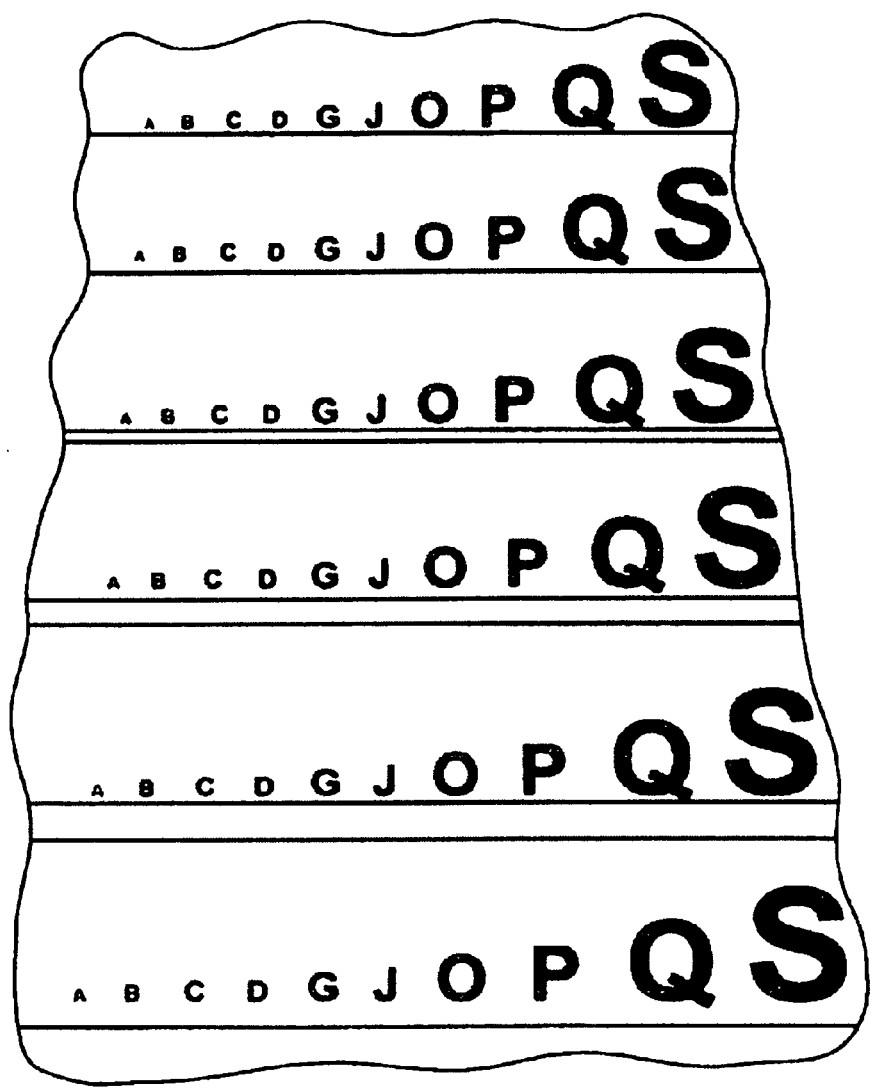
Figure 9C:
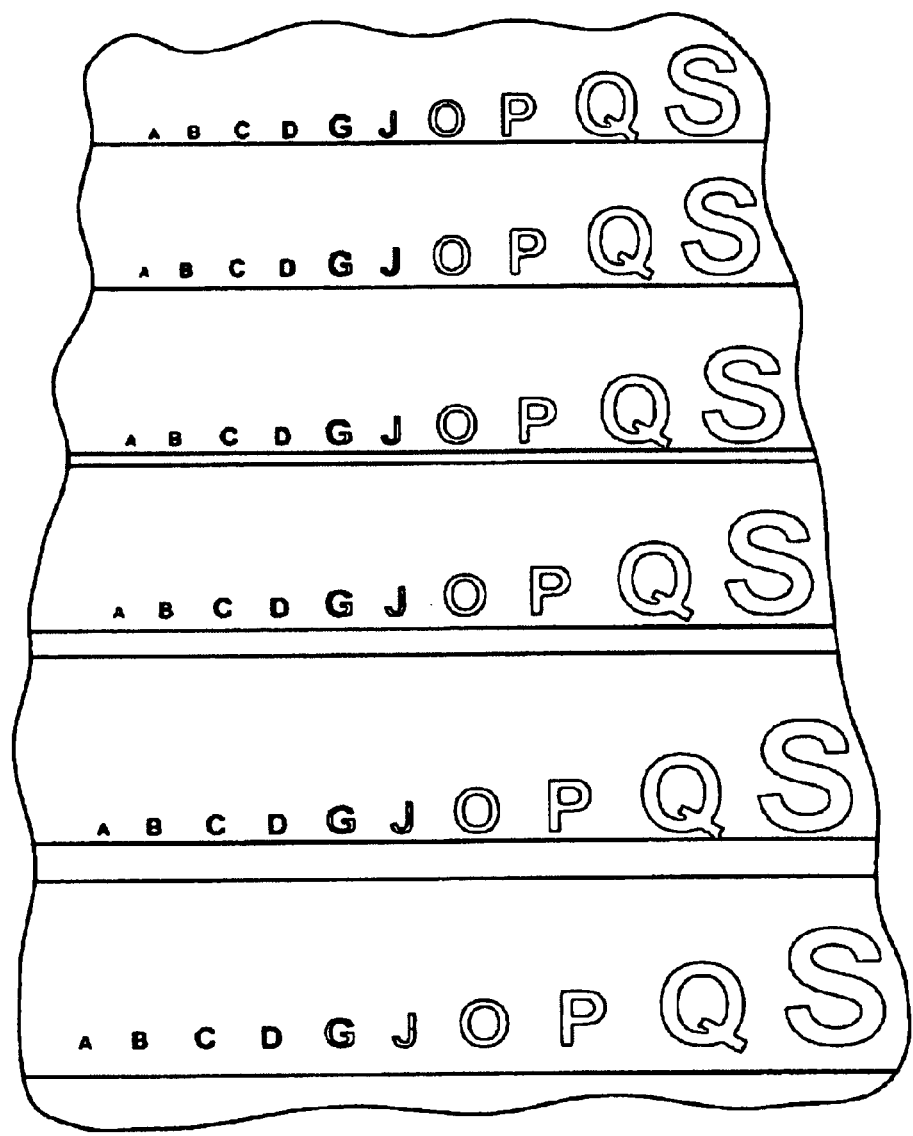
Figure 9D:
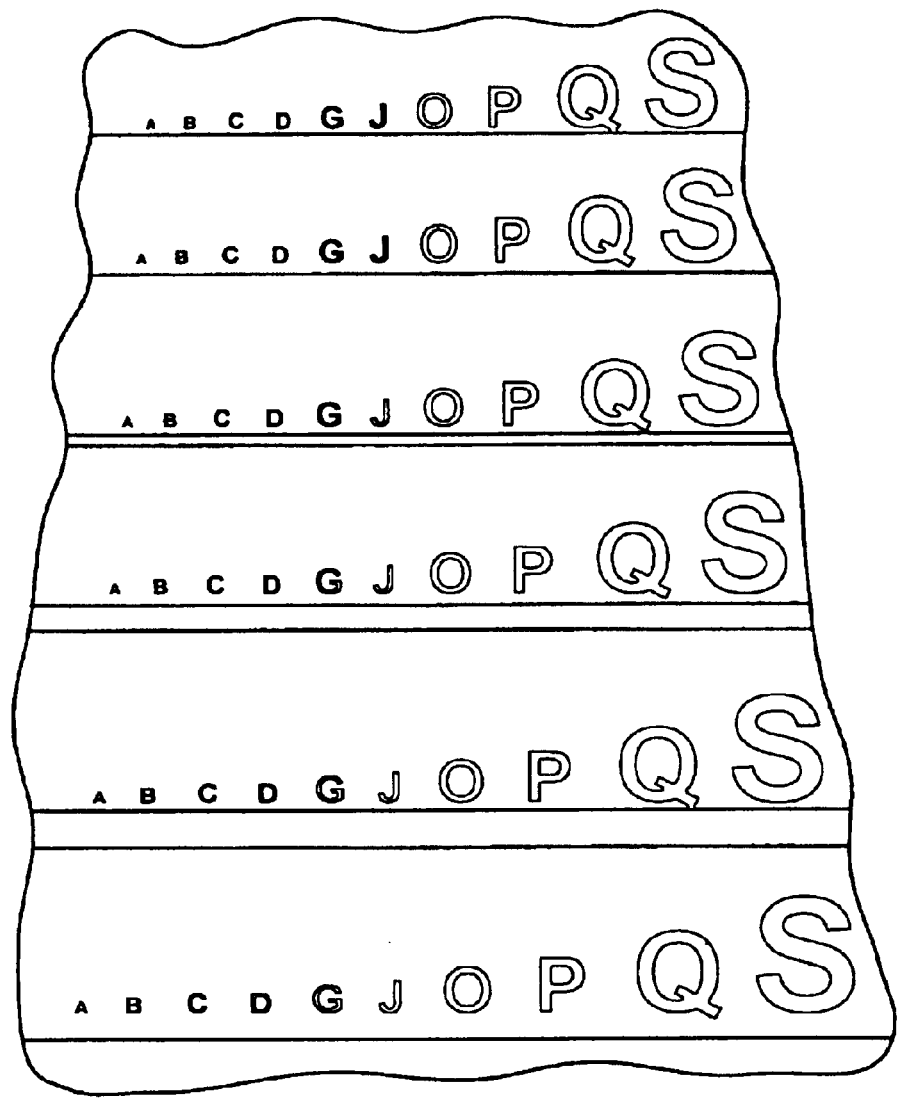
Figure 11:
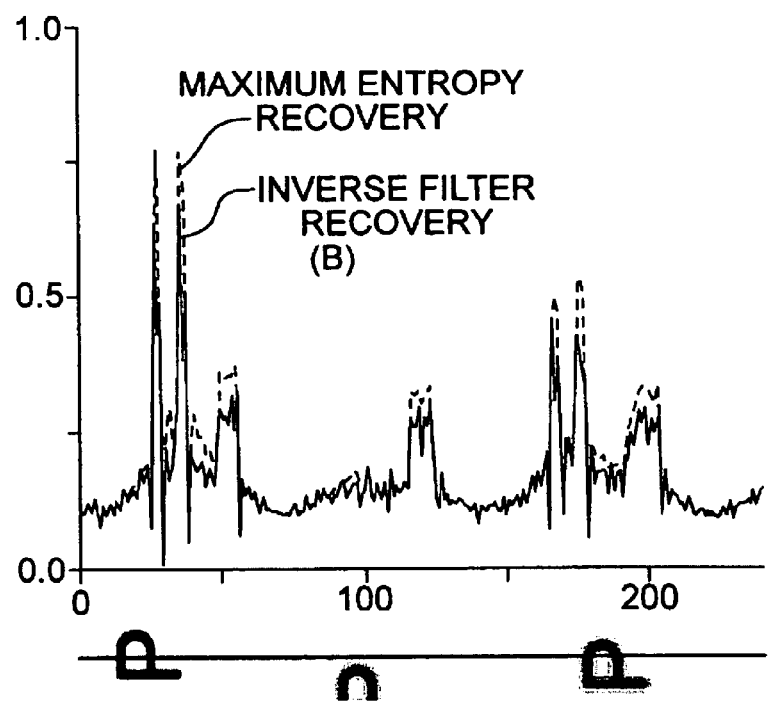
FIG. 11 is a graph illustrating a comparison of the sharpness of the pixels along a line through the recovered image provided by maximum entropy of FIG. 9D, as indicated by a dashed line, and the recovered image provided by inverse filter (B) of FIG. 9C, as indicated by a solid line, where the position of the line in each image is indicated, for example, by the line in the blurred image of FIG. 9A.
Figure 11A:
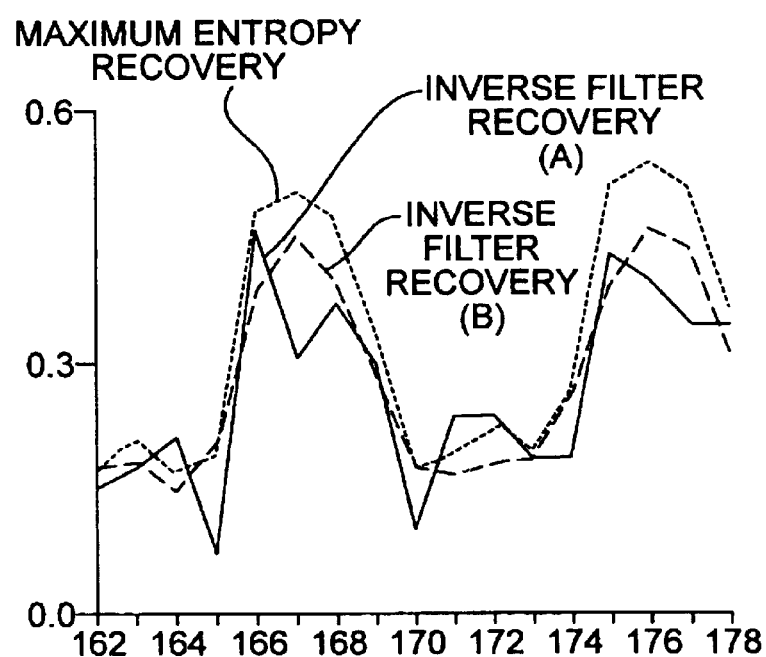
FIG. 11A is a more detailed view of graphs FIGS. 10 and 11 when combined, in which sharpness of the pixels along the line through the recovered image of FIG. 9D (maximum entropy) is indicated by a dotted line, the recovered image of FIG. 9B (inverse filter (A)) is indicated by a solid line, and the recovered image of FIG. 9C (inverse filter (B)) is indicated by a dashed line.
Figure 13A:
FIGS. 13A, 13B, 13C, and 13D are magnified images corresponding to a square region of FIGS. 12A, 12B, 12C and 12D, respectively, in which the position of the square region in each image is indicated by a box in FIG. 12A.
Figure 13B:
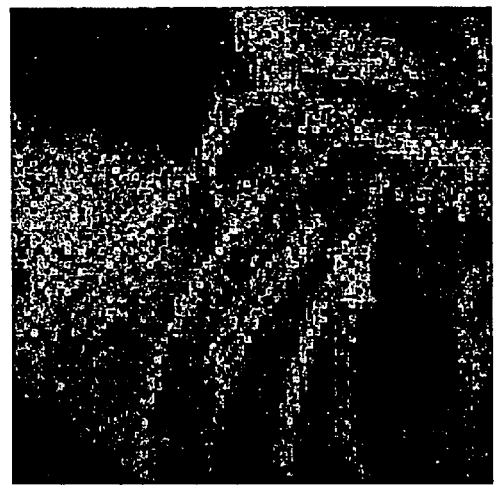
Figure 13C:
Figure 13D:
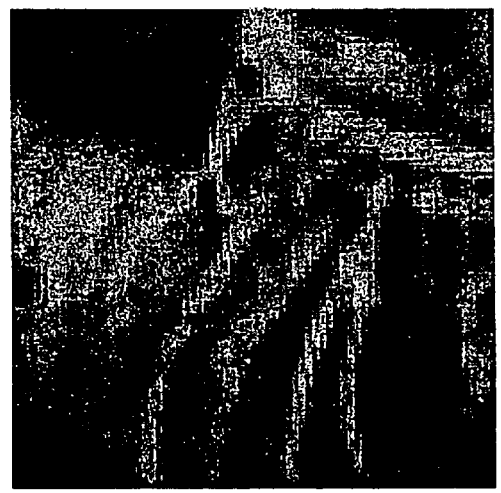

In a second example, images captured and processed by the system 8 with respect to the right part (letters) of the staircase object 13 of FIG. 1A are shown in FIG. 9A–9D, where FIG. 9A shows the blurred noisy image captured by camera 10. FIGS. 9B and 9C show recovered images of the blurred image processed by inverse filtering using two different noise models (A) and (B), respectively, while FIG. 9D shows the recovered image of the blurred image processed by maximum entropy. Although FIG. 9A is a noisy image, many of the letters of object 13 of FIG. 1A are still viewable without processing of FIGS. 9B–9D. FIG. 10 are graphs illustrating a comparison of the sharpness of the pixels along a line through the recovered image processed by maximum entropy of FIG. 9D and by the inverse filter (A) of FIG. 9B. FIG. 11 are graphs illustrating a comparison of the sharpness of the pixels along a line through the recovered image processed by maximum entropy of FIG. 9D and by the inverse filter (B) of FIG. 9C. The position of this line in each of the images analyzed in FIGS. 10 and 11 is indicated by line 33 in blurred image of FIG. 9A. Line 33 also appears below each of the graphs of FIGS. 10 and 11. FIG. 11A is a more detailed view of part of the graphs of FIGS. 10 and 11 between pixel positions 162 through 178. In FIGS. 10, 11, and 11A, the bottom axis represent pixel position along the line, and the side axis represents sharpness as measured by the proportion of pixel value in the respective recovered image to the pixel value in the blurred image (FIG. 9A) at the same pixel position.

In a third example, computer simulations of a tiger image with a point spread function of the logarithmic asp here lens are used to provide a blurred image of FIG. 12A, and recovered images are shown by processing using an edge sharpening filter of FIG. 12B, an inverse filter of FIG. 12C, and maximum entropy of FIG. 12D. FIGS. 13A–13D are magnified images of corresponding to a square region in each image FIGS. 12A–12D, respectively, of the same square region positioned in each image as illustrated by the white box outline 34 shown in FIG. 12A. This further illustrates that although different processing techniques may be applied in system 8 to a captured blurred image to provide a recovered image having an extended depth of field, the quality of the recovered image may depend on the processing method desired. Maximum entropy provides sharper in focus images than an edge sharpening filter or inverse filter. However, one may select use of image plane filtering, edge sharpening or other convolution filter to improve image processing speed. Further, as images of FIGS. 12A–12D show, the logarithmic asphere lens provided a level of suitable detail in a captured blurred image of FIG. 12A without processing of FIGS 12B–12D.

One application of the circular-symmetric, multi-focal aspheric lens 14 is to provide two particularly clear distances of operation, one is at arm's length, e.g., two feet, and the other at a longer distance, e.g., 20 feet to infinity. The camera 10 may be designed with a digital still camera or for a single use camera which will permit one to take their own pictures with some scenery in the far background.

As described earlier, camera 10 with lens 14 may be used for conventional photography of scenery, family groups, and so on, consisting of the logarithmic asphere lens, CCD array 11, electronics and computer processing means 16, which may be on-board the camera, or processed later. This system does not require mechanical focusing of a conventional camera, since within the extended depth of field (distance range) characteristic of the particular lens 14, any object or subject in the depth of field in photographs (images) will be in focus.

As stated earlier, lens 14 may be provided by a logarithmic phase plate 14a with any conventional (e.g., 35 mm) camera lens 15 (FIG. 1D). This phase plate may be mounted on any such conventional lens, just as one uses UV filter or color bandpass filter in 35 mm photography, or at other locations in a camera, such as at the aperture stop. With this phase plate mounted on a digital still camera, the output (blurred image) of the CCD array is processed as described earlier in order to obtain extended depth of field. Thus, camera 10 may be a digital (CCD) still camera or video camera having one of asphere lens 14 or a conventional lens 15 and phase plate 14a.

Although camera 10 is shown as using CCD array(s), other photodetector arrays may be used, such as CMOS, CID, or the like. When camera 10 represents a video camera, it is particularly useful since one can then make movies with greatly extended depth of field and at much lower light levels, since large aperture optics can be used. The resolution of the camera 10, and generally of system 8, may be limited by the pixel-size of the CCD array of the camera, i.e., it is not diffraction limited.

Optionally, the system 8 may be used with camera 10 representing a film-based camera having one of asphere lens 14 or a conventional lens 15 and phase plate 14a, as shown in FIG. 1C. The prints (or negatives) from such a film-based camera with the blurred image may then be scanned by a scanner into a digitized blurred image, which may be coupled to (or a file imported onto) the computer system 18, and then processed as described earlier for a digitally captured blurred image to provide a recovered image. When film is used, the multifocal aspheric lens 14 is diffraction limited, i.e., it provides an extended depth of field and it is diffraction limited as evidenced by the point spread function for the multifocal aspheric lens.

The system 8 provided by the present invention with the aspheric lens (or conventional lens and phase-plate) may be called a smart camera. In photography limited depth of field has been a great nuisance and it has greatly complicated camera design. In the smart camera, the picture (image) acquired at the CCD has been purposefully blurred by lens 14 and digital image processing can also be used for color correction. Examples have been described herein for a single logarithmic asphere lens, and separately a phase mask (or plate) with a Nikon 60 mm lens. Image processing results are shown comparing the Wiener-Helstrom inverse filter and maximum entropy methods; the latter providing better image quality. Applications include digital video, DVD pickup unit, handheld label scanners, and single-use cameras, or other applications requiring extended depth of field imaging.

The logarithmic aspheric lens 14 described above represents a new class of lenses. Different lenses in the class are provided by changing the weighting of the ratio (r/R) in Equation (3) and subsequent Equations (6) and (7) to effect rate of change of focal length to radius, thus providing different phase delay functions $\phi(r)$ in the lens when fabricated. Each such different lens can have different extended depth of field performance in the above-described system 8, or in other imaging applications.

From the foregoing description, it will be apparent that an improved system, method, and apparatus for imaging is provided using a logarithmic multifocal aspheric lens, as well as a new class of logarithmic multifocal aspheric lenses. Variations and modifications in the herein described system, method, and apparatus will undoubtedly become apparent to those skilled in the art. Accordingly, the foregoing description should be taken as illustrative and not in a limiting sense.

What is claimed is:

1. A system for imaging one or more objects comprising:
   means for capturing an image of at least one object through a circularly symmetric, multifocal aspheric lens which purposefully blurs the captured image; and
   means for processing the captured blurred image in accordance with the blurring caused by said lens to provide a recovered image of the object having an extended depth of field.

2. The system according to claim 1 wherein said object represents a three-dimensional object which extends over a range of distance, and said extended depth of field is characterized by at least a substantial portion of the object being in focus in said recovered image over said range of distance.

3. The system according to claim 1 wherein said lens is characterized by the equation:

$$\phi(r) = -\left\{ \frac{2\pi}{\lambda_0}(\sqrt{r^2 + t^2} - t) + \frac{\pi}{\lambda_0} \frac{R^2}{s_2 - s_1} \right.$$

$$\left[ \ln\left\{2\frac{s_2 - s_1}{R^2}\left[\sqrt{r^2 + \left(s_1 + \frac{s_2 - s_1}{R^2}r^2\right)^2} + \right.\right.\right.$$

$$\left.\left.\left.\left(s_1 + \frac{s_2 - s_1}{R^2}r^2\right)\right] + 1\right\} - \ln\left(4\frac{s_2 - s_1}{R^2}s_1 + 1\right)\right]\right\}$$

where, $\phi(r)$ is the phase delay for radius r of the lens to within an arbitrary constant, said range is over distances $s_1$ through $s_2$, R is the outer radius of the lens, t is the distance from the plane where the lens is disposed to the plane of image capture by said capturing means, and $\lambda_0$ is the free space wavelength.

4. The system according to claim 1 wherein said blurred image represents an array of pixel values, and said processing means applies a convolution matrix to said array of pixel values in accordance with the point spread function of said lens to provide said recovered image.

5. The system according to claim 4 wherein said convolution matrix is substantially an edge sharpening filter.

6. The system according to claim 1 wherein said means for processing the blurred image utilizes one of an inverse filter or maximum entropy to provide said recovered image.

7. The system according to claim 1 wherein said processing means is operative in accordance with the point spread function of the lens.

8. The system according to claim 1 wherein said processing means represents a computer system.

9. The system according to claim 1 further comprising means for outputting said recovered image.

10. The system according to claim 9 wherein said outputting means represents a display.

11. The system according to claim 1 wherein said lens is provided by one optical element.

12. The system according to claim 1 wherein said lens is provided by an optical system having multiple optical elements.

13. The system according to claim 1 wherein said capturing means comprises a camera which captures said blurred image through at least said lens, and said camera further comprises means for providing said blurred image to said processing means.

14. The system according to claim 13 wherein said providing means comprises removable memory in said camera for storing said blurred image, and said processing means comprises means for accessing said removable memory and retrieving said blurred image.

15. The system according to claim 13 wherein said providing means comprises one of a cable or optical connection between said camera and said processing means for transferring said blurred image to said processing means.

16. The system according to claim 13 wherein said camera represents a digital still or video camera.

17. The system according to claim 13 wherein said camera represents a digital video camera providing successive ones of said blurred images to said processing means, and said processing means processes each of said successive ones of said blurred images to provide corresponding successive recovered images.

18. The system according to claim 13 wherein said camera has at least one photodetector array to capture said blurred image through at least said lens.

19. The system according to claim 1 wherein said capturing means comprises a camera which captures said blurred image through at least said lens, and said camera further comprises said processing means to provide said recovered image from said blurred image.

20. The system according to claim 19 wherein said lens represents one or more optical elements.

21. The system according to claim 19 wherein said camera has a display for outputting said recovered image.

22. The system according to claim 19 wherein said camera represents a digital still or video camera.

23. The system according to claim 19 wherein said processing means represents a microprocessor-based system in said camera to provide said recovered image from said blurred image, and said camera has memory for storing said blurred image, said recovered image, or both said blurred image and recovered image.

24. The system according to claim 19 wherein said camera has at least one photodetector array to capture said blurred image through at least said lens.

25. The system according to claim 1 wherein said capturing means represents a camera for recording on film said blurred image captured through at least said lens, and means for digitizing one of a print or negative representing said blurred image recorded on said film to provided a digitized blurred image, in which said processing means operatives upon said digitized blurred image to provide said recovered image.

26. The system according to claim 1 wherein said capturing means comprises at least one CCD providing an array of pixels to record the blurred image, wherein each pixel has a size, and said imaging resolution of said system depends on said size of said pixel.

27. The system according to claim 1 wherein said lens is diffraction limited.

28. The system according to claim 1 wherein said lens provides two or more distances of operation of said system with respect to said capturing means.

29. The system according to claim 1 wherein said lens is characterized by a logarithmic phase function.

30. The system according to claim 1 wherein said means for processing the blurred image utilizes a Weiner Hellstrom inverse filter.

31. A system for imaging one or more objects comprising:

means for capturing an image of at least one object through a circularly symmetric, multifocal aspheric lens to provide a blurred image; and means for processing the captured blurred image to provide a recovered image of the object having an extended depth of field, wherein said object represents a three-dimensional object which extends over a range of distance, and said extended depth of field is characterized by at least a substantial portion of the object being in focus in said recovered image over said range of distance, and said lens has a radius and annular portions of continuously varying focal length in accordance with said radius of the lens, in which said object at each distance in said range is in focus by at least one of said annular portions of said lens, and said object is blurred by other of said annular portions of said lens.

32. A system for imaging one or more objects comprising:

means for capturing an image of at least one object through a circularly symmetric, multifocal aspheric lens to provide a blurred image; and means for processing the captured blurred image to provide a recovered image of the object having an extended depth of field, wherein said lens has a radius and said lens is multifocal by having a focal length which continuously varies with the radius of said lens.

33. A system for imaging one or more objects comprising:

means for capturing an image of at least one object through a circularly symmetric, multifocal aspheric lens to provide a blurred image; and means for processing the captured blurred image to provide a recovered image of the object having an extended depth of field, wherein said lens is provided by an optical system having multiple optical elements, and said multiple optical elements represent a multifocal phase plate and an objective lens.

34. The system according to claim 33 wherein angular field of view of capturing means is in accordance with the angular field of view of the objective lens.

35. A system for imaging one or more objects comprising:

means for capturing an image of at least one object through a circularly symmetric, multifocal aspheric lens to provide a blurred image; and means for processing the captured blurred image to provide a recovered image of the object having an extended depth of field, wherein said lens is characterized by the equation:

$$\phi(r) = -\left\{\frac{2\pi}{\lambda_0}(\sqrt{r^2+t^2}-t) + \frac{\pi}{\lambda_0}\frac{R^2}{s_2-s_1}\right.$$
$$\left[\ln\left\{2\frac{s_2-s_1}{R^2}\left[\sqrt{r^2+\left(s_1+\frac{s_2-s_1}{R^2}r^2\right)^2}+\left(s_1+\frac{s_2-s_1}{R^2}r^2\right)\right]+\right.\right.$$
$$\left.\left.1\right\} - \ln\left(4\frac{s_2-s_1}{R^2}s_1+1\right)\right]\right\}.$$

where, $\phi(r)$ is the phase delay for radius r of the lens to within an arbitrary constant, said range is over distances $s_1$ through $s_2$, R is the outer radius of the lens, t is the distance from the plane where the lens is disposed to the plane of image capture by said capturing means, and $\lambda_0$ is the free space wavelength, and different ones of said lens characterized by $\phi(r)$ are provided by changing the weighting of the ratio r/R to effect the rate of change of focal length of said lens with the radius of said lens.

36. A method for imaging one or more three-dimensional objects comprising the steps of:
  imaging at least one object through a circularly symmetric aspheric lens to provide a blurred image purposefully blurred by said lens; and
  processing said blurred image in accordance with the blurring caused by said lens to provide a recovered image of the object having an extended depth of field.

37. The method according to claim 36 wherein said object represents a three-dimensional object which extends over a range of distances, and said extended depth of field is characterized by at least a substantial portion of the object being in focus in said recovered image over said range of distances.

38. The method according to claim 36 wherein said lens is characterized by the equation:

$$\phi(r) = -\left\{\frac{2\pi}{\lambda_0}(\sqrt{r^2+t^2}-t) + \right.$$
$$\frac{\pi}{\lambda_0}\frac{R^2}{s_2-s_1}\left[\ln\left\{2\frac{s_2-s_1}{R^2}\left[\sqrt{r^2+\left(s_1+\frac{s_2-s_1}{R^2}r^2\right)^2}+\right.\right.\right.$$
$$\left.\left.\left.\left(s_1+\frac{s_2-s_1}{R^2}r^2\right)\right]+1\right\}-\ln\left(4\frac{s_2-s_1}{R^2}s_1+1\right)\right]\right\}$$

where, $\phi(r)$ is the phase delay for radius r of the lens to within an arbitrary constant, said range is over distances $s_1$ through $s_2$, R is the outer radius of the lens, t is the distance from the plane where the lens is disposed to the plane of image capture by said capturing means, and $\lambda_0$ is the free space wavelength.

39. The method according to claim 36 wherein said processing step utilizes a convolution matrix to provide the recovered image.

40. The method according to claim 39 wherein said convolution matrix represents an edge sharpening filter.

41. The method according to claim 36 wherein said processing step utilizes one of inverse filtering or maximum entropy to provide the recovered image.

42. The method according to claim 36 further comprising the step of displaying said recovered image.

43. The method according to claim 36 wherein said lens is provides by one or more optical elements.

44. The method according to claim 36 wherein said capturing step is carried out with the aid of a camera which records said blurred image through at least said lens.

45. The method according to claim 44 wherein said processing step is carried out in said camera.

46. The method according to claim 44 wherein said camera represents one of a digital still imaging camera or digital video camera.

47. The method according to claim 44 wherein said camera represents a digital video camera providing successive ones of said blurred images to said processing step, and said processing step processes each of said successive ones of said blurred images to provide corresponding successive recovered images.

48. The method according to claim 44 wherein said camera records on film said blurred image captured through at least said lens, and said method further comprises the step of digitizing one of a print or negative representing said blurred image recorded on said film to provided a digitized blurred image, in which said processing step is carried out using said digitized blurred image to provide said recovered image.

49. The method according to claim 44 wherein said lens provides two or more distances from said camera where said recovered image is in focus.

50. The method according to claim 36 wherein said processing step is carried out by a computer system.

51. The method according to claim 36 wherein said processing step is carried in accordance with the point spread function of the lens.

52. The method according to claim 36 wherein said capturing step utilizes at least one CCD providing an array of pixels to record the blurred image, wherein each pixel has a size, and said resolution of said system depends on said size of said pixel.

53. The method according to claim 36 wherein said lens is diffraction limited.

54. A method for imaging one or more three-dimensional objects comprising the steps of:
  imaging at least one object through a circularly symmetric aspheric lens to provide a blurred image; and
  processing said blurred image to provide a recovered image of the object having an extended depth of field, wherein said object represents a three-dimensional object which extends over a range of distances, and said extended depth of field is characterized by at least a substantial portion of the object being in focus in said recovered image over said range of distances, and said lens has a radius and annular portions of continuously varying focal length in accordance with said radius of the lens, in which said object at each distance in said range is in focus by at least one of said annular portions of said lens, and said object is blurred by other of said annular portions of said lens.

55. A method for imaging one or more three-dimensional objects comprising the steps of:
  imaging at least one object through a circularly symmetric aspheric lens to provide a blurred image; and
  processing said blurred image to provide a recovered image of the object having an extended depth of field, wherein said lens has a radius and said lens is multi-focal by having a focal length which continuously varies with the radius of said lens.

56. A method for imaging one or more three-dimensional objects comprising the steps of:
  imaging at least one object through a circularly symmetric aspheric lens to provide a blurred image; and
  processing said blurred image to provide a recovered image of the object having an extended depth of field, wherein said lens represents an optical system having a multi-focal phase plate and an objective lens.

57. The method according to claim 56 wherein angular field of view of capturing means is in accordance with the angular field of view of the objective lens.

58. A smart camera comprising:
optics having circularly symmetric multiple focal lengths;
at least one detector array for capturing an image through said optics to provide a blurred image purposefully blurred by said optics; and
means for processing the captured blurred image in accordance with the blurring caused by said lens to provide a recovered image having an extended depth of field.

59. The camera according to claim 58 wherein said optics is provided by a circularly symmetric aspheric lens.

60. The camera according to claim 58 wherein said optics is provided by an objective lens and a circularly symmetric aspheric lens.

61. The camera according to claim 58 wherein said detector array represents one of a CCD array, CMOS array, or CID array.

62. The camera according to claim 58 wherein said lens has a point spread function, and said processing means operates upon said blurred image in accordance with said point spread function of said lens to provide said recovered image.

63. The camera accordingly to claim 62 wherein said lens is diffraction limited in accordance with said point spread function.

64. The camera according to claim 58 wherein said processing means utilizes one of an inverse filtering, convolution matrix, or maximum entropy upon the blurred image to provide the recovered image.

65. A smart camera comprising:
optics having circularly symmetric multiple focal lengths;
at least one detector array for capturing an image through said optics to provide a blurred image; and
means for processing the captured blurred image to provide a recovered image having an extended depth of field, wherein said optics is provided by an objective lens and a multi-focal phase plate.

66. An imaging system comprising:
means for capturing an image through a circularly symmetric, multifocal lens which purposefully blurs the image; and
means for processing the captured blurred image in accordance with the blurring caused by said lens to provide a recovered image having an extended depth of field.

67. A multifocal optical element comprising a body which is characterized by a logarithmic phase function, wherein said logarithm phase function is provided by $\phi(r)$ in accordance with the equation:

$$\phi(r) = -\left\{ \frac{2\pi}{\lambda_0}(\sqrt{r^2+t^2}-t) + \right.$$

$$\frac{\pi}{\lambda_0}\frac{R^2}{s_2-s_1}\left[\ln\left\{2\frac{s_2-s_1}{R^2}\left[\sqrt{r^2+\left(s_1+\frac{s_2-s_1}{R^2}r^2\right)^2} + \right.\right.\right.$$

$$\left.\left.\left.\left(s_1+\frac{s_2-s_1}{R^2}r^2\right)\right]+1\right\} - \ln\left(4\frac{s_2-s_1}{R^2}s_1+1\right)\right]\right\}.$$

where, $\phi(r)$ is the phase delay for radius r of the lens to within an arbitrary constant, said range is over distances $s_1$ through $s_2$, R is the outer radius of the lens, t is the distance from the plane where the lens is disposed to the plane of image capture by said capturing means, and $\lambda_0$ is the free space wavelength, and wherein different ones of said lens characterized by $\phi(r)$ are provided by changing the weighting of the ratio r/R to effect the rate of change of focal length of said lens with the radius of said lens.

68. The optical element according to claim 67, wherein said body represents one of a lens and a phase-plate.

69. An imaging system comprising:
a circularly symmetric multifocal aspheric lens; and
means for capturing an image through said multifocal aspheric lens, wherein said lens has a radius and annular portions of continuously varying focal length in accordance with said radius of the lens.

70. An imaging system comprising:
a circularly symmetric multifocal aspheric lens; and
means for capturing an image through said multifocal aspheric lens, wherein said lens has a radius and said lens is multifocal by having a focal length which continuously varies with the radius of said lens.

71. The system according to claim 70 wherein said lens provides an extended depth of field.

72. The system according to claim 70 wherein said lens is characterized by the equation:

$$\phi(r) = -\left\{ \frac{2\pi}{\lambda_0}(\sqrt{r^2+t^2}-t) + \right.$$

$$\frac{\pi}{\lambda_0}\frac{R^2}{s_2-s_1}\left[\ln\left\{2\frac{s_2-s_1}{R^2}\left[\sqrt{r^2+\left(s_1+\frac{s_2-s_1}{R^2}r^2\right)^2} + \right.\right.\right.$$

$$\left.\left.\left.\left(s_1+\frac{s_2-s_1}{R^2}r^2\right)\right]+1\right\} - \ln\left(4\frac{s_2-s_1}{R^2}s_1+1\right)\right]\right\}.$$

where, $\phi(r)$ is the phase delay for radius r of the lens to within an arbitrary constant, said range is over distances $s_1$ through $s_2$, R is the outer radius of the lens, t is the distance from the plane where the lens is disposed to the plane of image capture by said capturing means, and $\lambda_0$ is the free space wavelength.

73. The system according to claim 70 wherein said lens is provided by one optical element.

74. The system according to claim 70 wherein said lens is provided by an optical system having multiple optical elements.

75. The system according to claim 70 wherein said capturing means comprises at least one photodetector array to capture said image through at least said lens.

76. The system according to claim 70 wherein said lens is characterized by a logarithmic phase function.

77. An imaging system comprising:
a circularly symmetric multifocal aspheric lens; and
means for capturing an image through said multifocal aspheric lens, wherein said lens is characterized by the equation:

$$\phi(r) = -\left\{ \frac{2\pi}{\lambda_0}(\sqrt{r^2+t^2}-t) + \right.$$

$$\frac{\pi}{\lambda_0}\frac{R^2}{s_2-s_1}\left[\ln\left\{2\frac{s_2-s_1}{R^2}\left[\sqrt{r^2+\left(s_1+\frac{s_2-s_1}{R^2}r^2\right)^2} + \right.\right.\right.$$

-continued $$\left.\left.\left(s_1 + \frac{s_2-s_1}{R^2}r^2\right)\right] + 1\right\} - \ln\left(4\frac{s_2-s_1}{R^2}s_1 + 1\right)\right]\right\}.$$

where, $\phi(r)$ is the phase delay for radius r of the lens to within an arbitrary constant, said range is over distances $s_1$ through $s_2$, R is the outer radius of the lens, t is the distance from the plane where the lens is disposed to the plane of image capture by said capturing means, and $\lambda_0$ is the free space wavelength, and wherein different ones of said lens characterized by $\phi(r)$ are provided by changing the weighting of the ratio r/R to effect the rate of change of focal length of said lens with the radius of said lens.

78. An imaging system comprising:
a circularly symmetric multifocal aspheric lens; and
means for capturing an image through said multifocal aspheric lens, wherein said lens is provided by an optical system having multiple optical elements, and said multiple optical elements represent a multi-focal phase plate and an objective lens.

79. A method for imaging comprising the step of:
imaging through a circularly symmetric aspheric lens to provide an image having an extended depth of field, wherein said lens has a radius and annular portions of continuously varying focal length in accordance with said radius of the lens.

80. A method for imaging comprising the step of:
imaging through a circularly symmetric aspheric lens to provide an image having an extended depth of field, wherein said lens has a radius and said lens is multifocal by having a focal length which continuously varies with the radius of said lens.

81. The method according to claim 80 wherein said lens is characterized by the equation:

$$\phi(r) = -\left\{\frac{2\pi}{\lambda_0}\left(\sqrt{r^2+t^2} - t\right) + \right.$$

$$\frac{\pi}{\lambda_0}\frac{R^2}{s_2-s_1}\left[\ln\left\{2\frac{s_2-s_1}{R^2}\left[\sqrt{r^2 + \left(s_1+\frac{s_2-s_1}{R^2}r^2\right)^2} + \right.\right.\right.$$

$$\left.\left.\left(s_1 + \frac{s_2-s_1}{R^2}r^2\right)\right] + 1\right\} - \ln\left(4\frac{s_2-s_1}{R^2}s_1 + 1\right)\right]\right\}.$$

where, $\phi(r)$ is the phase delay for radius r of the lens to within an arbitrary constant, said range is over distances $s_1$ through $s_2$, R is the outer radius of the lens, t is the distance from the plane where the lens is disposed to the plane of image capture by said capturing means, and $\lambda_0$ is the free space wavelength.

* * * * *